United States Patent
Chang et al.

(10) Patent No.: US 8,057,953 B2
(45) Date of Patent: Nov. 15, 2011

(54) COUPLING STRUCTURE OF FUEL CELLS

(75) Inventors: Shung-Huei Chang, Taipei (TW);
Shu-Hao Liang, Taipei (TW)

(73) Assignee: Wistron Corporation, Taipei (TW)

( * ) Notice: Subject to any disclaimer, the term of this patent is extended or adjusted under 35 U.S.C. 154(b) by 1050 days.

(21) Appl. No.: 11/976,934

(22) Filed: Oct. 30, 2007

(65) Prior Publication Data
US 2009/0169961 A1    Jul. 2, 2009

(30) Foreign Application Priority Data
Jul. 4, 2007   (TW) .............................. 96124328 A

(51) Int. Cl.
*H01M 2/00*  (2006.01)

(52) U.S. Cl. ....................................... 429/507; 429/535

(58) Field of Classification Search .......... 429/507–511, 429/535, 452, 545, 456–463, 467, 471
See application file for complete search history.

(56) References Cited

U.S. PATENT DOCUMENTS

| | | | | |
|---|---|---|---|---|
| 6,511,766 | B1 * | 1/2003 | Loutfy et al. ................. | 429/454 |
| 2003/0194597 | A1 * | 10/2003 | Ganski et al. .................. | 429/38 |
| 2004/0086762 | A1 * | 5/2004 | Maeda et al. .................. | 429/32 |
| 2005/0048346 | A1 * | 3/2005 | Fannon et al. ................. | 429/34 |
| 2005/0064254 | A1 * | 3/2005 | Bourgeois ....................... | 429/18 |
| 2005/0089751 | A1 | 4/2005 | Oogami et al. | |
| 2006/0115706 | A1 | 6/2006 | Maeda et al. | |

FOREIGN PATENT DOCUMENTS

| | | |
|---|---|---|
| CN | 1494746 | 5/2004 |
| TW | 200629628 A | 8/2006 |

* cited by examiner

*Primary Examiner* — Barbara Gilliam
*Assistant Examiner* — Maria J Laios
(74) *Attorney, Agent, or Firm* — Rosenberg, Klein & Lee

(57) ABSTRACT

The coupling structure of fuel cells according to the present invention comprises a body and a plurality of channels. A first fuel cell is adapted on a first side of the body; a second fuel cell is adapted on a second side of the body. The plurality of channels penetrates through the first and the second sides. Each of the channels connects to a fuel-guiding inlet, a fuel-guiding outlet, an oxidant-gas-guiding inlet, and an oxidant-gas-guiding outlet of the first and the second fuel cells, respectively. The coupling structure has an insulation property with a conductive module embedded used for conducting a negative terminal of the first fuel cell and a positive terminal of the second fuel cell on the first and the second sides. By means of a coupling module, the internal wires can be used for cascading or isolating the positive and the negative terminals of the two fuel cells. The coupling structure has channels for fuel (anode) and oxidant gas (cathode), used for communicating the fuel or oxidant gas while cascading two or more fuel cells. Thereby, convenience of cascading planarly fuel cells can be enhanced.

23 Claims, 13 Drawing Sheets

COUPLING STRUCTURE OF FUEL CELLS

FIELD OF THE INVENTION

The present invention relates generally to a coupling structure, and more particularly to a coupling structure of fuel cells.

BACKGROUND OF THE INVENTION

Owing to the technological developments and trends, portable products tend to be smaller and lighter. For example, mobile phones, notebook computers, camcorders, or personal digital assistants (PDAs) adopt the design concept towards lightness, thinness, shortness, and smallness. Thereby, batteries for the portable products have to be miniaturized. Due to miniaturization of the batteries, the capacity thereof is reduced. Hence, the usage time of the portable products is shortened accordingly. When using notebooks computers, mobile phones, or camcorders, low battery condition happens frequently owing to low capacity of the batteries. Besides, charging takes time, and carrying the charger is troublesome. When going abroad, it is possible that the plug specification of the charger is not compatible with the outlet.

If a portable product can free a user from the charging problems and can make the user use the portable product anytime and anywhere, its convenience will definitely enhance. However, the capacity of current lithium batteries has approached theoretical limits, thus they are difficult to meet the power demand of future portable products. With diversification in functions of portable products, the power demand increases rapidly. Thereby, it is needed urgently a novel battery, which not only can maintain the design concept of miniaturization, but also can sustain long-time usage. A fuel cell has the characteristic of high energy density. Once the fuel (such as hydrogen or methanol) is supplied continuously, power can be generated uninterruptedly. Accordingly, people are interested in the application of fuel cells in power supply and backup power.

Nevertheless, the voltage of a single fuel cell is relatively low. Depending on different characteristics of fuels, the theoretical voltage of the electrochemical cells is around 1 volt, which is not applicable to electronic precuts. Thereby, multiple cells will generally be cascaded to form a battery set with suitable voltage and capacity.

FIG. 1 shows a structural schematic diagram of stacked fuel cells according to the prior art. As shown in the figure, the general cascading method is to stack the cells, and use a bipolar plate 5 as a connector to form a fuel cell stack 10. Adopting the bipolar plate 5 is more efficient, because the bipolar plate 5 itself is like a wire to connect the positive and the negative terminals, thus avoiding possible impedance increase due to wiring, and saving the volume and weight of an electrode plate.

FIGS. 2A and 2B show a side view and top view of planar fuel cells according to the prior art. As shown in the figures, planar arrangement is adopted by the prior art, and wires are used to cascade the independent single cells 15. However, in some application environments, owing to limitation imposed by space and geometry, independent single cells 15 can only be arranged planarly. Take the structure of a notebook computer for example. Because the appearance of the product is flat, stacked batteries cannot be integrated into the machine like lithium-ion batteries, but can only be connected externally and used as a backup power, which does not comply with the usage behavior of normal customers. Thereby, planar fuel cells with cascade connection are obviously an inevitable design direction in notebook computer application. This is also true for other consumer electronic products.

FIG. 3 shows a three-dimensional view of planar fuel cells according to another prior art. As shown in the figure, the current common method of cascading planar fuel cells is to secure a plurality of single cells 25 on a substrate 30. However, because the fuel is inputted from the top of the substrate 30, and the oxidant gas is inputted from the bottom of the substrate 30, thus it is convenient for the connection of the fuel pipes and oxidant gas pipes. That is to say, the negative terminals of all single cells 25 are on the top, while the positive terminals are at the bottom. Hence, when cascading a plurality of single cells 25, the wires have to be connected in the fashion of one end on the top and the other at the bottom, which makes wiring complex. In addition to complex electrical wiring, the supply of the fuel and oxidant gas is also troublesome, especially the connection of the liquid and gas pipes. Without excellent design of joints, leakage tends to occur.

Accordingly, the present invention provides a coupling structure of fuel cells, which cascades the fuel cells planarly, and simplifies wiring problems while cascading the fuel cells. Besides, the fuel and oxidant gas can be supplied conveniently. Thereby, the problems occurred in the prior art as described above can be solved.

SUMMARY

An objective of the present invention is to provide a coupling structure of fuel cells, which adapts a coupling module in a body for cascading to or isolating from positive and negative terminals of two fuel cells. Thereby, not only the convenience of cascading planarly fuel cells is increased, but when some fuel cells are failed or damaged, those failed or damaged fuel cells can also be isolated without affecting the operation of other fuel cells.

Another objective of the present invention is to provide a coupling structure of fuel cells, which uses a plurality of channels to link the fuel of a plurality of fuel cells, or to link the oxidant gas of the plurality of fuel cells. Hence, the convenience of cascading planarly fuel cells is increased.

The present invention provides a coupling structure of fuel cells, which comprises a body, a plurality of channels, and a conductive module. The body has a first side and a second side. A first fuel cell is adapted on the first side, while a second fuel cell is adapted on the second side. One or more fuel-guiding inlets, fuel-guiding outlets, oxidant-gas-guiding inlets, and oxidant-gas-guiding outlets are adapted on the sides of the first and the second fuel cells facing the body. The plurality of channels penetrates through the first and the second sides. Each of the channels connects to the fuel-guiding inlets, the fuel-guiding outlets, the oxidant-gas-guiding inlets, and the oxidant-gas-guiding outlets, respectively. Both ends of the conductive module penetrate the first and the second sides, and connect to a negative terminal of the first fuel cell and a positive terminal of the second fuel cell, respectively. Thereby, by the coupling module, the positive and negative terminals of the two fuel cells are cascaded to or isolated from each other. Not only the convenience of cascading planarly fuel cells is increased, but when some fuel cells are failed or damaged, those failed or damaged fuel cells can also be isolated without affecting the operation of other fuel cells. Besides, the channels are used to communicate the fuel or the oxidant gas of the plurality of fuel cells, further enhancing convenience of cascading planarly fuel cells.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
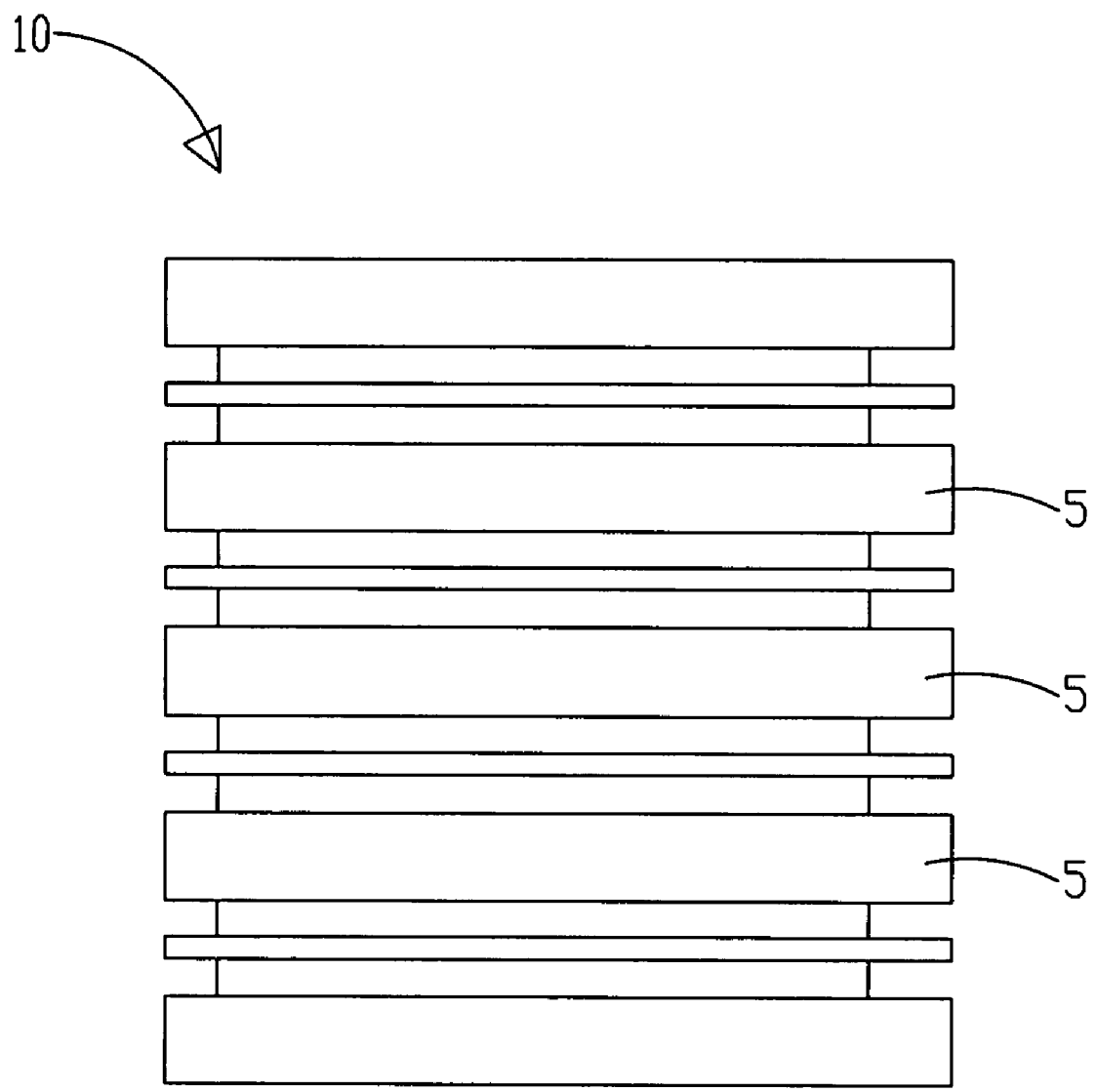
FIG. 1 shows a structural schematic diagram of stacked fuel cells according to the prior art.
Figure 2:
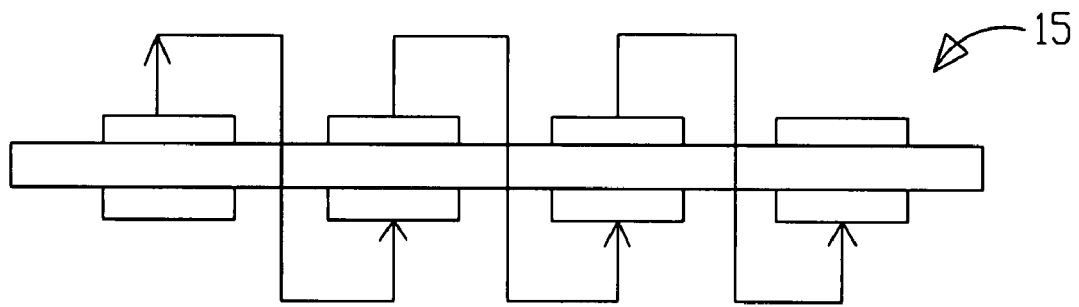
FIG. 2A shows a side view of planar fuel cells according to the prior art.
FIG. 2B shows a top view of planar fuel cells according to the prior art.
Figure 2:
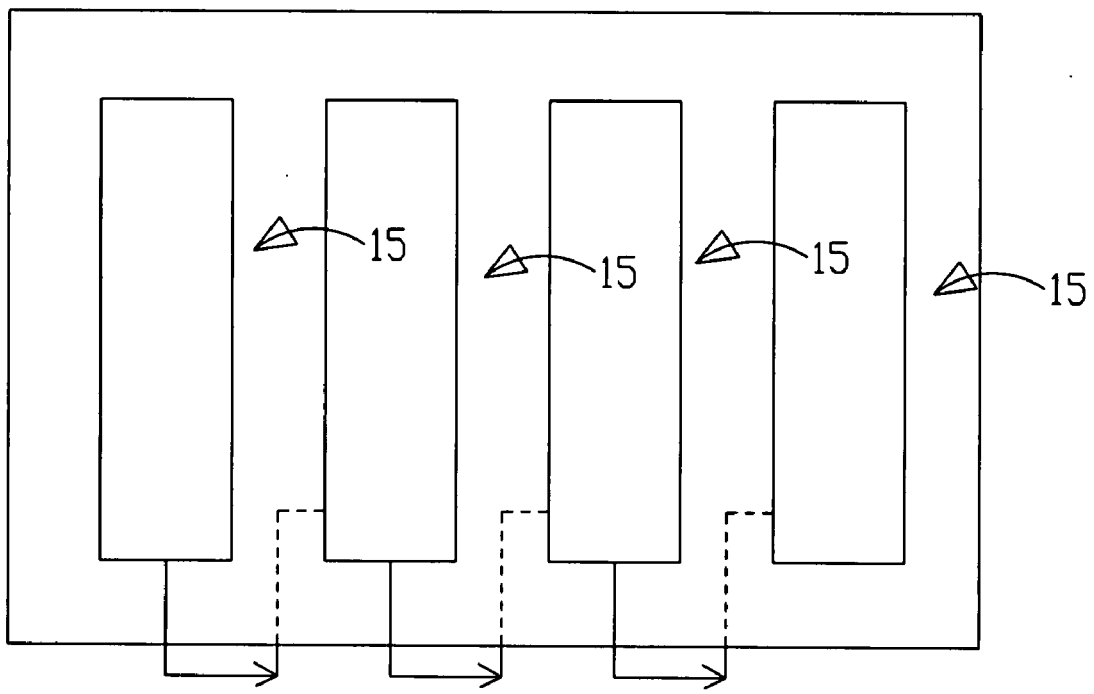
Figure 3:
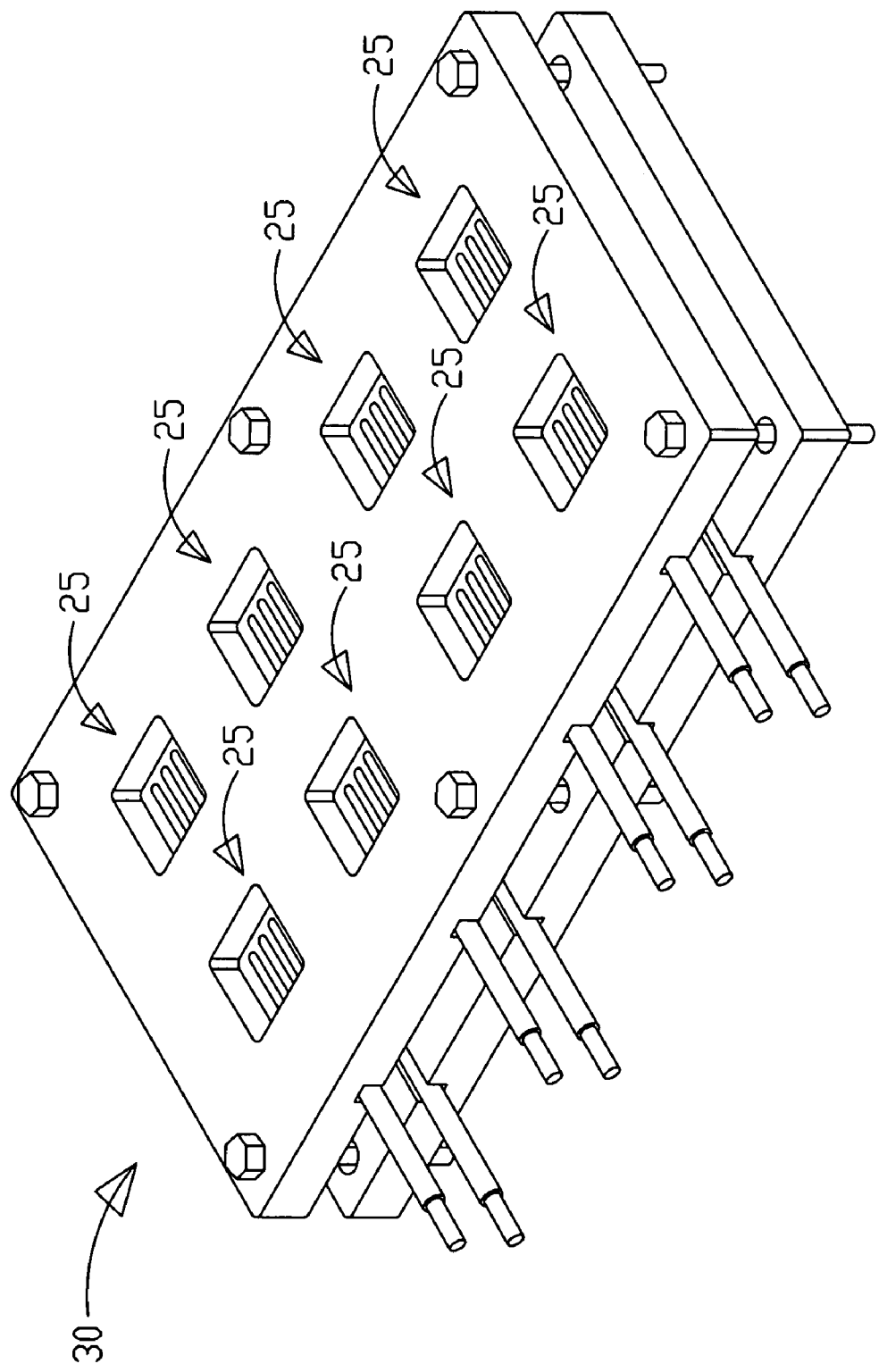
FIG. 3 shows a three-dimensional view of planar fuel cells according to another prior art.
Figure 4:
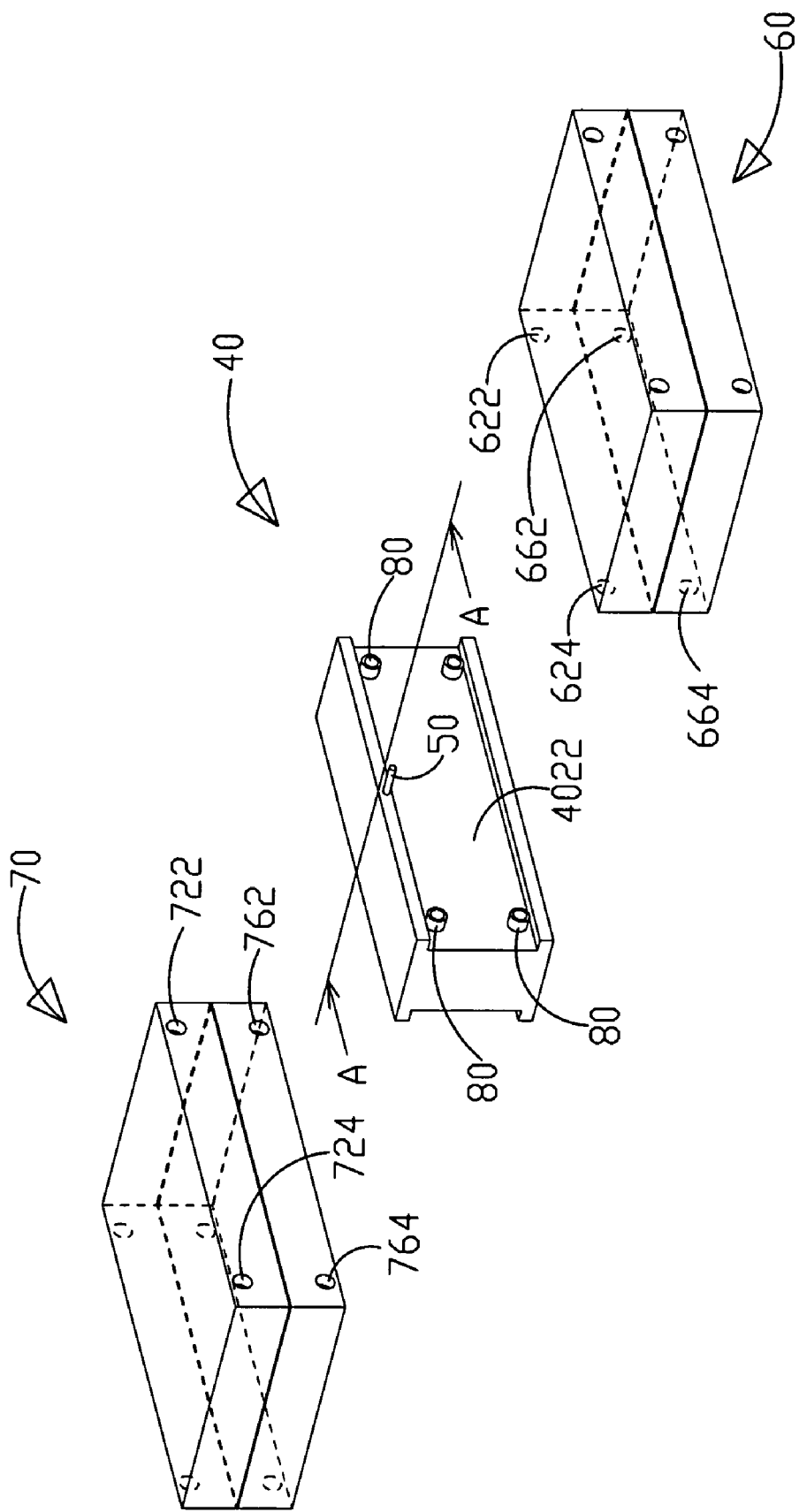
FIG. 4 shows a three-dimensional view according to a preferred embodiment of the present invention.
Figure 5:
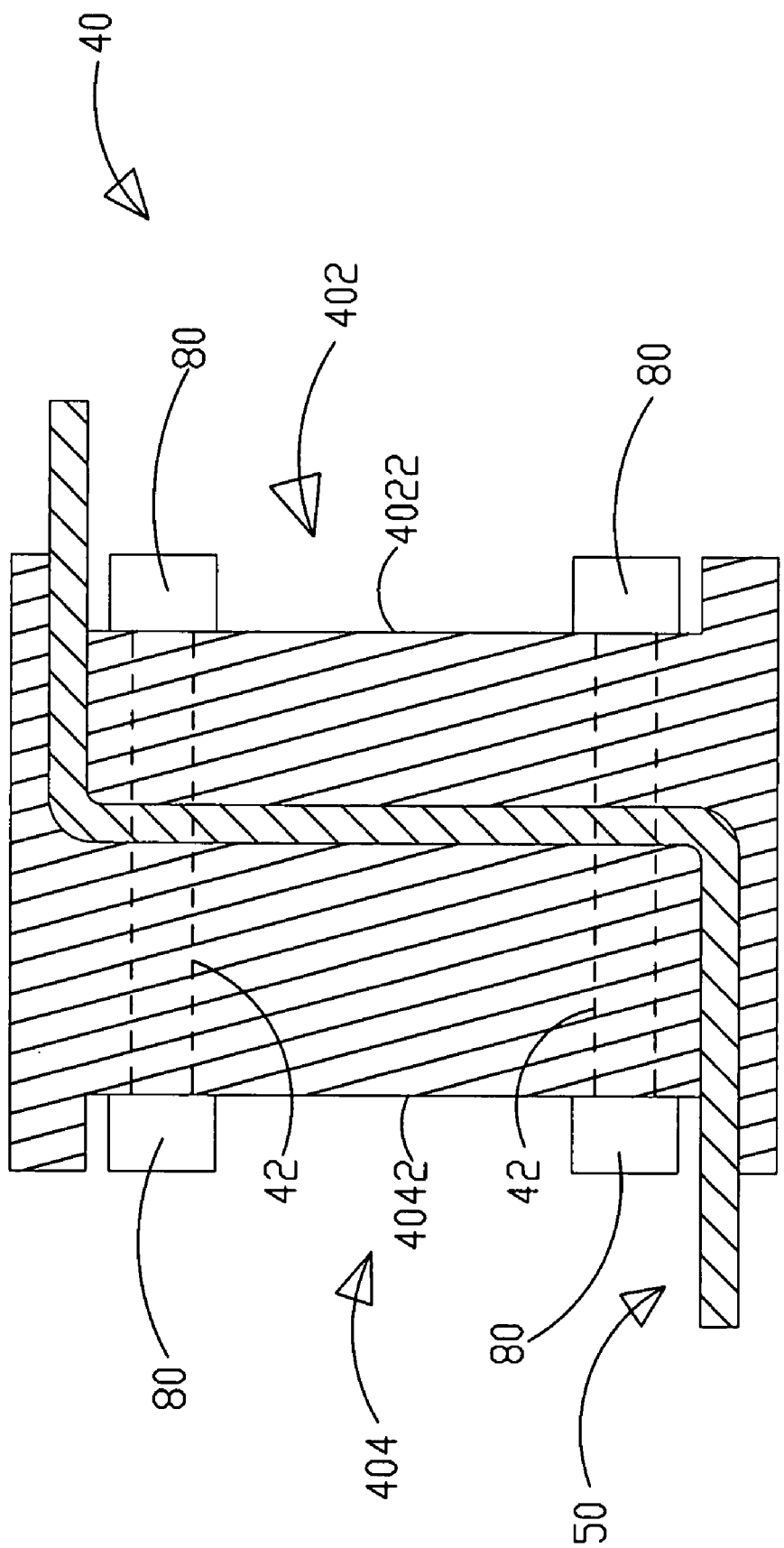
FIG. 5 shows a cross-sectional view along the A-A' direction in FIG. 4.

FIGS. 4 and 5 show a three-dimensional view and a cross-sectional view along the A-A' direction in FIG. 4 according to a preferred embodiment of the present invention. As shown in the figures, the coupling structure of fuel cells according to the present invention comprises a body 40, a plurality of channels 42, and a conductive module 50. The body 40 has a first side 402 and a second side 404. A first fuel cell 60 is adapted on the first side 402, while a second fuel cell 70 is adapted on the second side 404. One or more fuel-guiding inlets 622, 722, fuel-guiding outlets 624, 724, oxidant-gas-guiding inlets 662, 762, and oxidant-gas-guiding outlets 664, 764 are adapted on the sides of the first and the second fuel cells 60, 70 facing the body 40. The plurality of channels 42 penetrates through the first and the second sides 402, 404. Each of the channels 42 connects to the fuel-guiding inlets 622, 722, the fuel-guiding outlets 624, 724, the oxidant-gas-guiding inlets 662, 762, and the oxidant-gas-guiding outlets 664, 764, respectively. Both ends of the conductive module 50 penetrate the first and the second sides 402, 404, and connect to a negative terminal of the first fuel cell 60 and a positive terminal of the second fuel cell 70, respectively.

The conductive module 50 is a conductor such as a metal wire. Thereby, the conductive module 50 can be used to couple the first and the second fuel cells 60, 70 to each other in planar arrangement. The conductive module 50 connects the negative terminal of the first fuel cell 60 to the positive terminal of the second fuel cell 70 without complex wiring for cascading fuel cells. Thereby, the convenience of cascading the first and the second fuel cells 60, 70 is increased. For example, the conductive module 50 can be connected electrically by connectors to the first or the second fuel cells 60, 70. Alternatively, electrical contacts can be set at the locations corresponding to the conductive module 50. Hence, when the first or the second fuel cells 60, 70 are adapted in the body 40, the conductive module 50 can connect electrically to them.

The channels 42 communicate the fuel or oxidant gas of the first and the second fuel cells 60, 70. Thereby, only one of the first or the second fuel cells 60, 70 has to be supplied with the fuel or oxidant gas, then the other fuel cell can have the fuel or oxidant gas as well. Consequently, the convenience of cascading planarly fuel cells is enhanced.

In addition, a coupling device 80 is adapted on both ends of the channels 42, respectively. On the fuel-guiding inlets 622, 722, the fuel-guiding outlets 624, 724, oxidant-gas-guiding inlets 662, 762, and the oxidant-gas-guiding outlets 664, 764 of the first and the second fuel cells 60, 70, a trench for accommodating the coupling device 80 can be set, respectively. The shape of the trenches matches the coupling devices 80. Thereby, by means of the coupling devices 80, the first and the second fuel cells 60, 70 can be assembled on the body 40 more conveniently. In order to further facilitate assembling the first and the second fuel cells 60, 70 on the body 40, a first trench 4022 is adapted on the first side 402, while a second trench 4042 is adapted on the second side 404. The first trench 4022 is used for installing the first fuel cell 60, while the second trench 4042 is used for installing the second fuel cell 70.

Figure 6A:
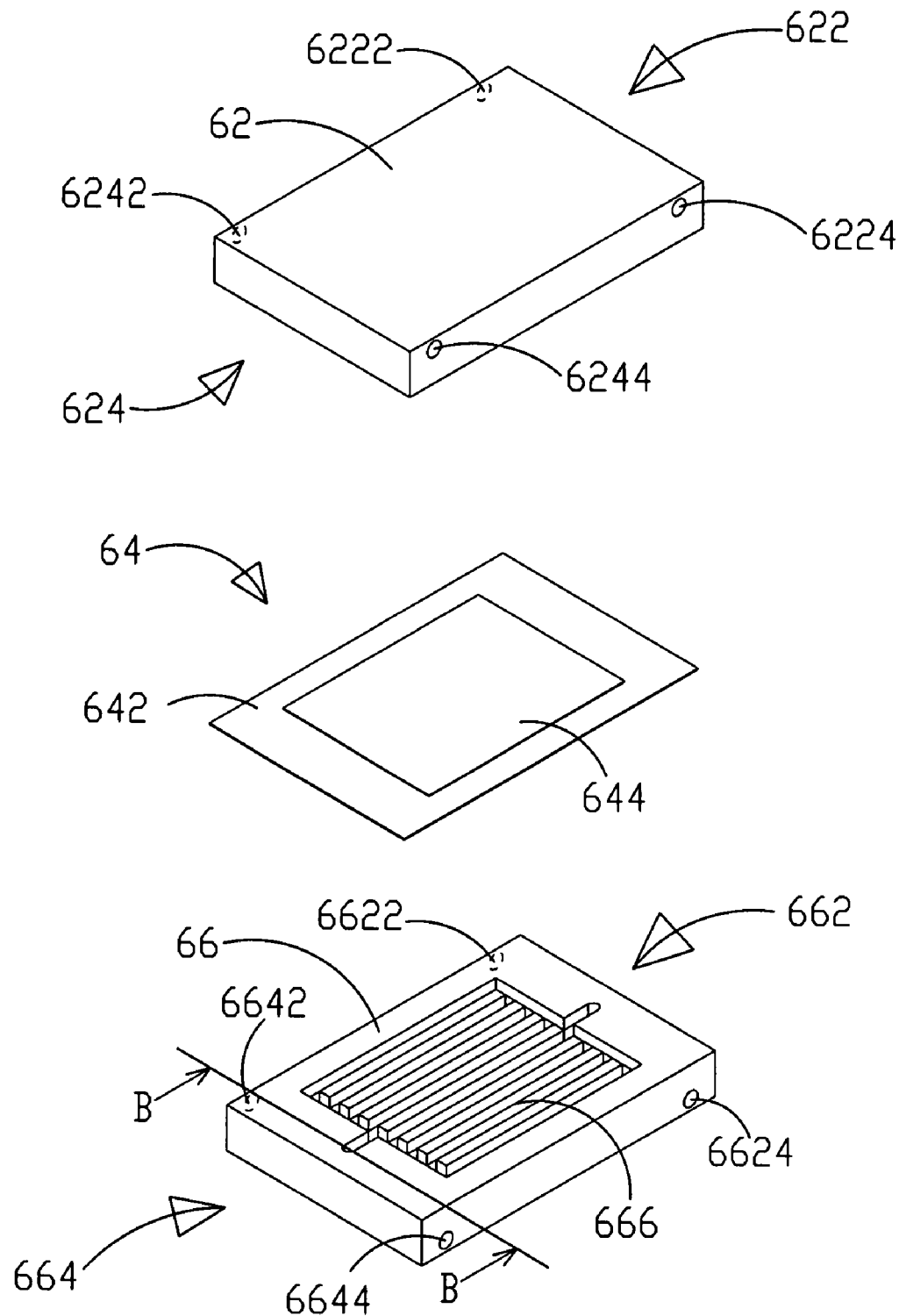
FIG. 6A shows a structural schematic diagram of the fuel cells according to a preferred embodiment of the present invention.
Figure 6B:
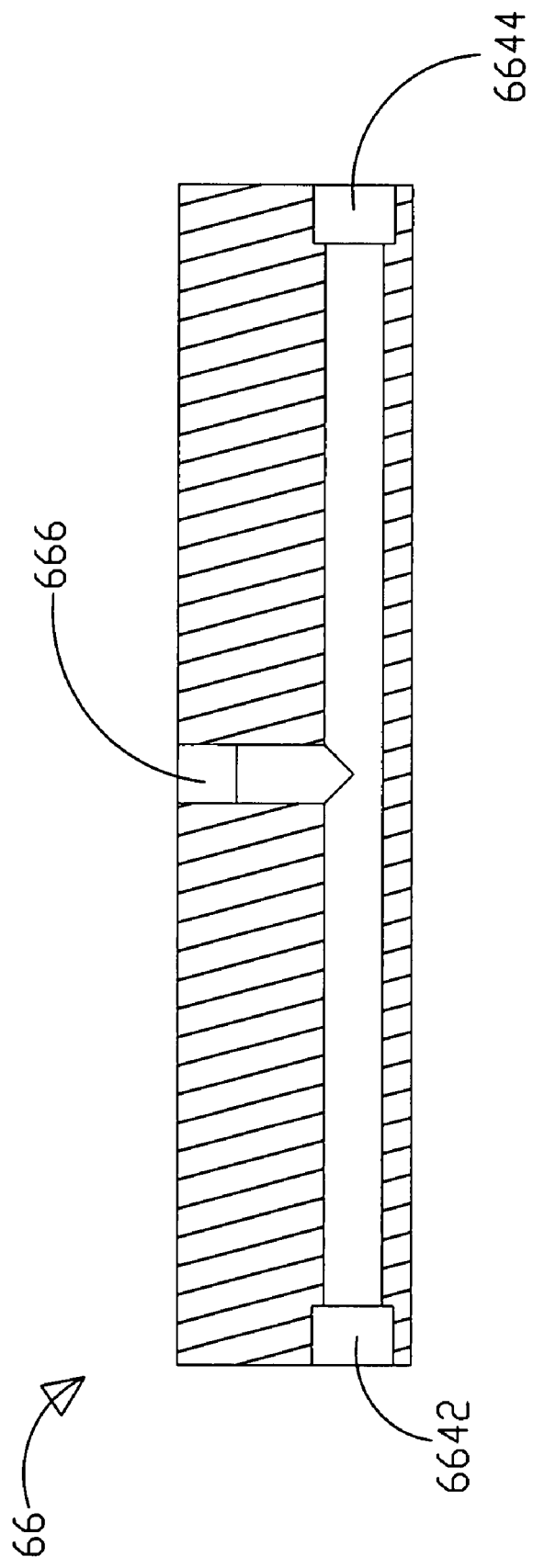
FIG. 6B shows a cross-sectional view along the B-B' direction in FIG. 6A.
Figure 6C:
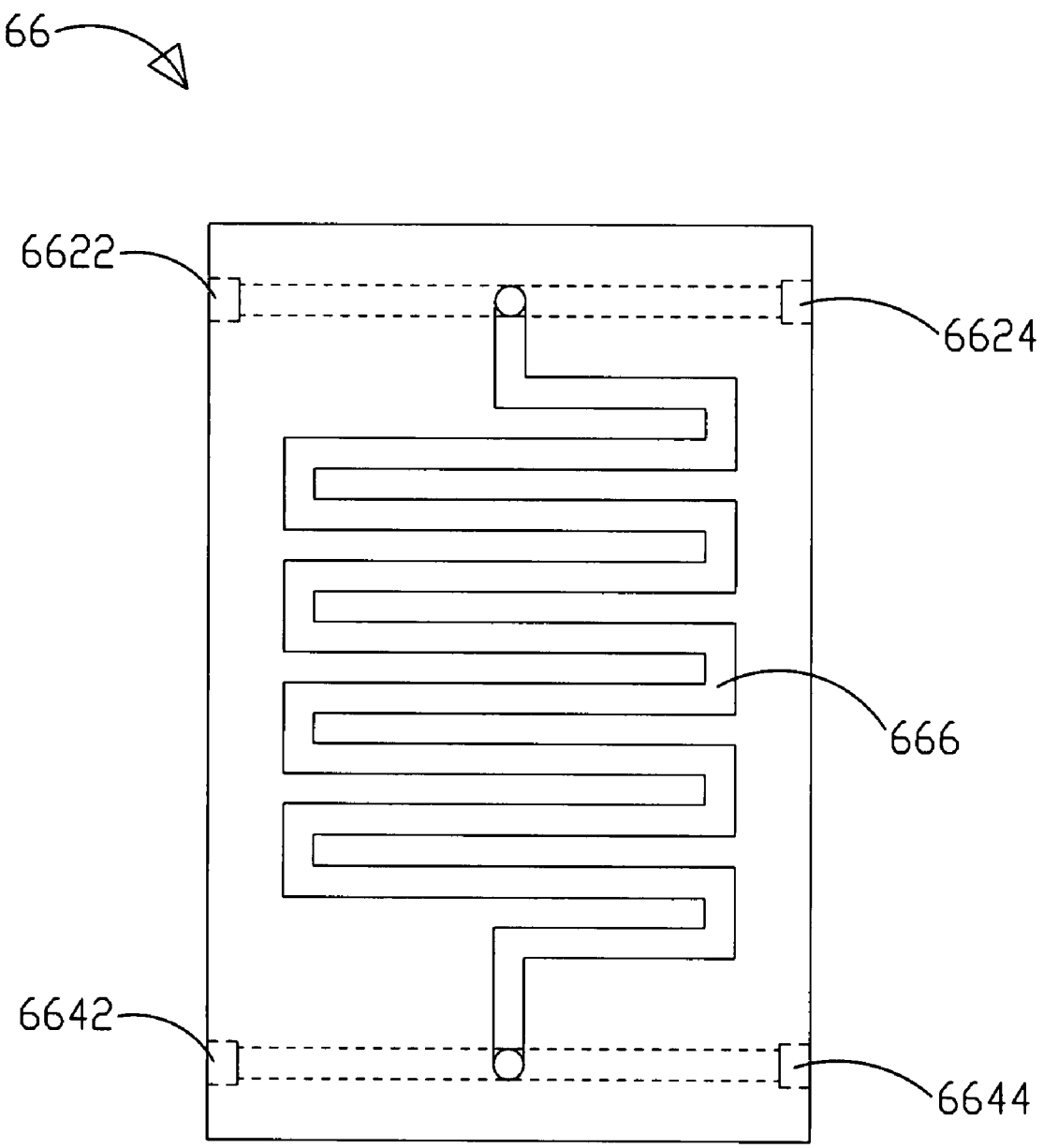
FIG. 6C shows a structural schematic diagram of the guiding plate according to a preferred embodiment of the present invention.

FIGS. 6A, 6B, and 6C show a structural schematic diagram of the fuel cells, a cross-sectional view along the B-B' direction in FIG. 6A, and a structural schematic diagram of the guiding plate according to a preferred embodiment of the present invention. As shown in the figures, the first fuel cell 60 according to the present invention includes a flow field plate of fuel 62, a membrane electrode assembly 64, and a flow field plate of oxidant gas 66. The membrane electrode assembly 64 is composed of an anode catalytic electrode 642, a proton exchange membrane 644, and a cathode catalytic electrode (not shown in the figure). The anode catalytic electrode 642 and the cathode catalyst electrode are adapted on both sides of the proton exchange membrane 644. The flow field plate of fuel 62 is located on one side of the membrane electrode assembly 64. That is, the flow field plate of fuel 62 and the anode catalytic electrode 642 are on the same side, while the flow field plate of oxidant gas 66 is located on the other side of the membrane electrode assembly 64. A fuel channel 626, the fuel-guiding inlet 622, and the fuel-guiding outlet 624 are adapted on one side of the flow field plate of fuel 62. The fuel channel 626, the fuel-guiding inlet 622, and the fuel-guiding outlet 624 communicate with each other, such that the fuel-guiding inlet 622 and the fuel-guiding outlet 624 communicate with each other. An oxidant gas channel 666, the oxidant-gas-guiding inlet 662, and the oxidant-gas-guiding outlet 664 are adapted on one side of the flow field plate of oxidant gas 66. The oxidant gas channel 666, the oxidant-gas-guiding inlet 662, and the oxidant-gas-guiding outlet 664 communicate with each other, such that the oxidant-gas-guiding inlet 662 and the oxidant-gas-guiding outlet 664 communicate with each other. According to the present preferred embodiment, the first fuel cell 60 is used as for description, and the flow field plate of oxidant gas 66 is used for describing the structure and relative relation among the oxidant gas channel 666, the oxidant-gas-guiding inlet 662, and the oxidant-gas-guiding outlet 664. However, the structure of the second fuel cell 70 is identical to that of the first fuel cell 60, and the structure of the flow field plate of fuel 62 is identical to that of the flow field plate of oxidant gas 66. Thereby, detailed descriptions are omitted.

The fuel-guiding inlet 622 includes a first fuel-guiding inlet 6222 and a second fuel-guiding inlet 6224, which are opposite to each other. The fuel-guiding outlet 624 includes a first fuel-guiding outlet 6242 and a second fuel-guiding outlet 6244. The first fuel-guiding outlet 6242 is adjacent to the first fuel-guiding inlet 6222. The second fuel-guiding outlet 6244 is adjacent to the second fuel-guiding inlet 6224, and is opposite to the first fuel-guiding outlet 6242. The oxidant-gas-guiding inlet 662 includes a first oxidant-gas-guiding inlet 6622 and a second oxidant-gas-guiding inlet 6624, which are opposite to each other. The oxidant-gas-guiding outlet 664 includes a first oxidant-gas-guiding outlet 6642 and a second oxidant-gas-guiding outlet 6644. The first oxidant-gas-guiding outlet 6642 is adjacent to the first oxidant-gas-guiding inlet 6622. The second oxidant-gas-guiding outlet 6644 is adjacent to the second oxidant-gas-guiding inlet 6624, and is opposite to the first oxidant-gas-guiding outlet 6642.

Figure 7:
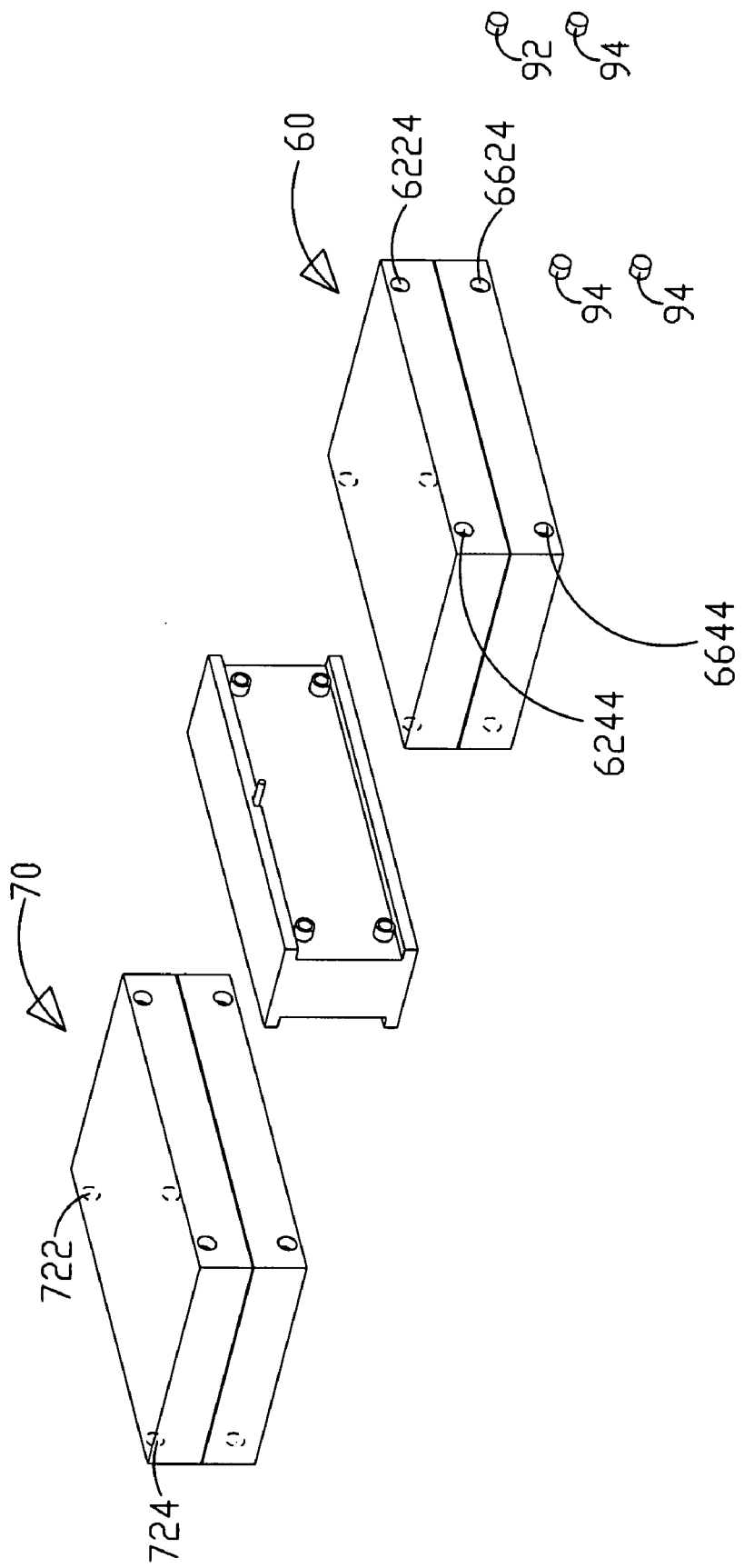
FIG. 7 shows a schematic diagram of the block member according to a preferred embodiment of the present invention.

FIG. 7 shows a schematic diagram of the block member according to a preferred embodiment of the present invention. As shown in the figure, cascading the first and the second fuel cells 60, 70 are used as description. Thereby, the fuel and oxidant gas can be inputted from the first or the second fuel cells 60, 70. The fuel can be methanol or hydrogen; the oxidant gas can be air or oxygen. According to the present preferred embodiment, the fuel and the oxidant gas are inputted from the second fuel cell 70. In the present preferred embodiment, a first block member 92 and a second block member 94 cover the second fuel-guiding inlet 6224 and the second fuel-guiding outlet 6244 of the first fuel cell 60. Thereby, when the fuel and oxidant gas are inputted from the second fuel cell 70, the fuel and oxidant gas are transported to the first fuel cell 60 via the channels 42. Besides, a closed pipe for fuel recycle can be adapted on the fuel-guiding inlet 722 of the second fuel cell 70. The closed pipe is connected to the fuel-guiding outlet 724. By using a separator, the gas produced by chemical reactions can be exhausted, and the remaining fuel after reactions can be recycled. Likewise, the first and the second block members 92, 94 can be adapted in the second fuel cell 70, and the fuel and oxidant gas are inputted from the first fuel cell 60. Moreover, two cascading fuel cells are described in the present preferred embodiment. Multiple fuel cells can be cascaded according to the method described in the present invention.

Figure 8:
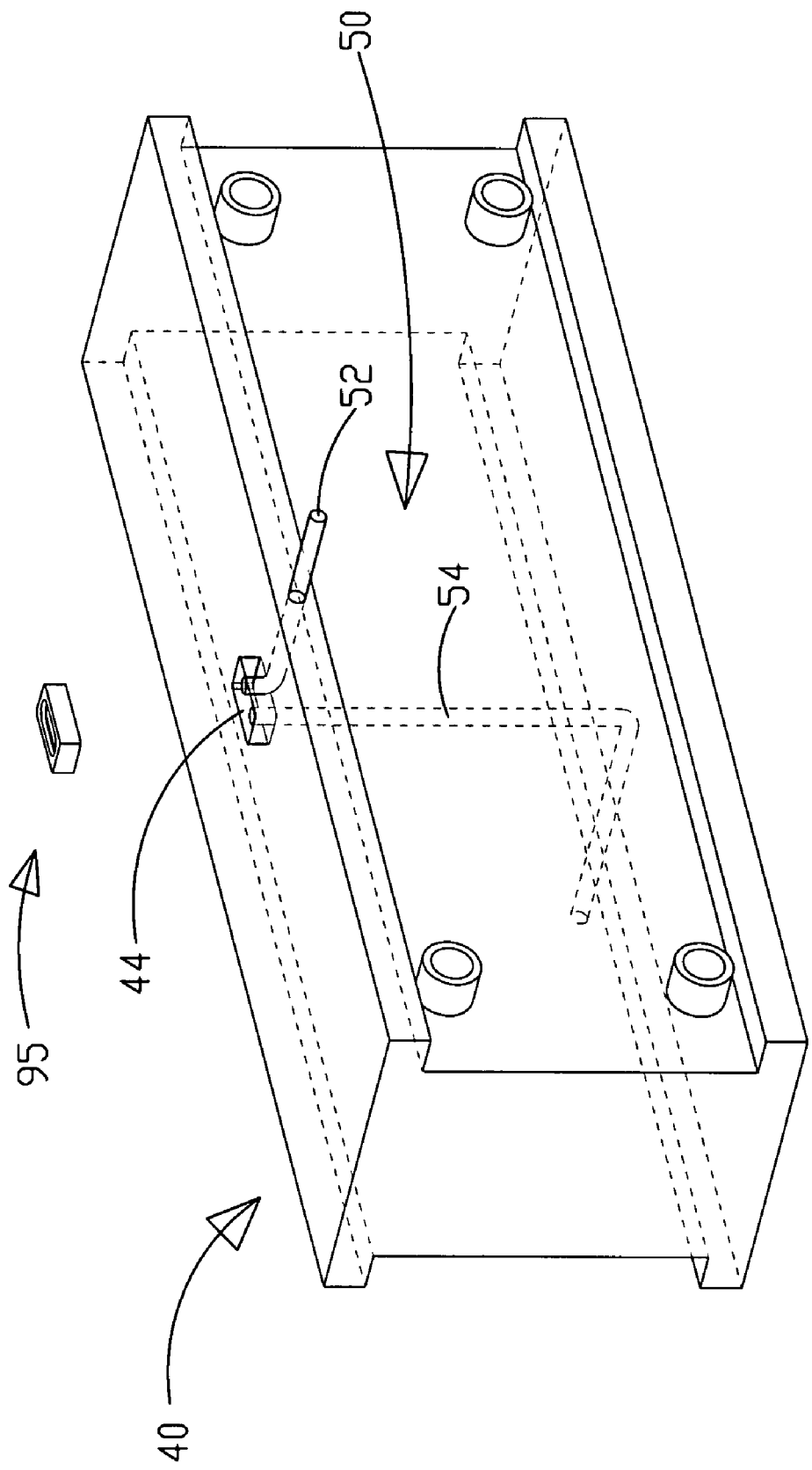
FIG. 8 shows a structural schematic diagram according to another preferred embodiment of the present invention.

FIG. 8 shows a structural schematic diagram according to another preferred embodiment of the present invention. As shown in the figure, the difference between the present preferred embodiment and the one in FIG. 5 is that in the present preferred embodiment, the conductive module 50 includes a negative electrode 52 and a positive electrode 54. A first end of the negative electrode 52 is adapted on the first side 402, and connects with the negative terminal of the first fuel cell 60. A first end of the positive electrode 54 is adapted on the second side 404, and connects with the positive terminal of the second fuel cell 70. The conductive module 50 according to the present preferred embodiment further includes a switch 95, which is adapted on top of the body 40. The switch 95 connects electrically with a second end of the positive electrode 54 and a second end of the negative electrode 52 to make the first fuel cell 60 cascade with of the second fuel cell 70.

The switch 95 is a jumper or a Complementary Metal-Oxide-Semiconductor (CMOS) switch. In the present preferred embodiment, a jumper is used for description. An accommodating trench is adapted on top of the body 40 to facilitate adapting the switch 95 in the accommodating trench 44. In terms of the switch 95, a user can close or open the connection of a fuel cell freely, enhancing usage convenience of fuel cells.

Figure 9:
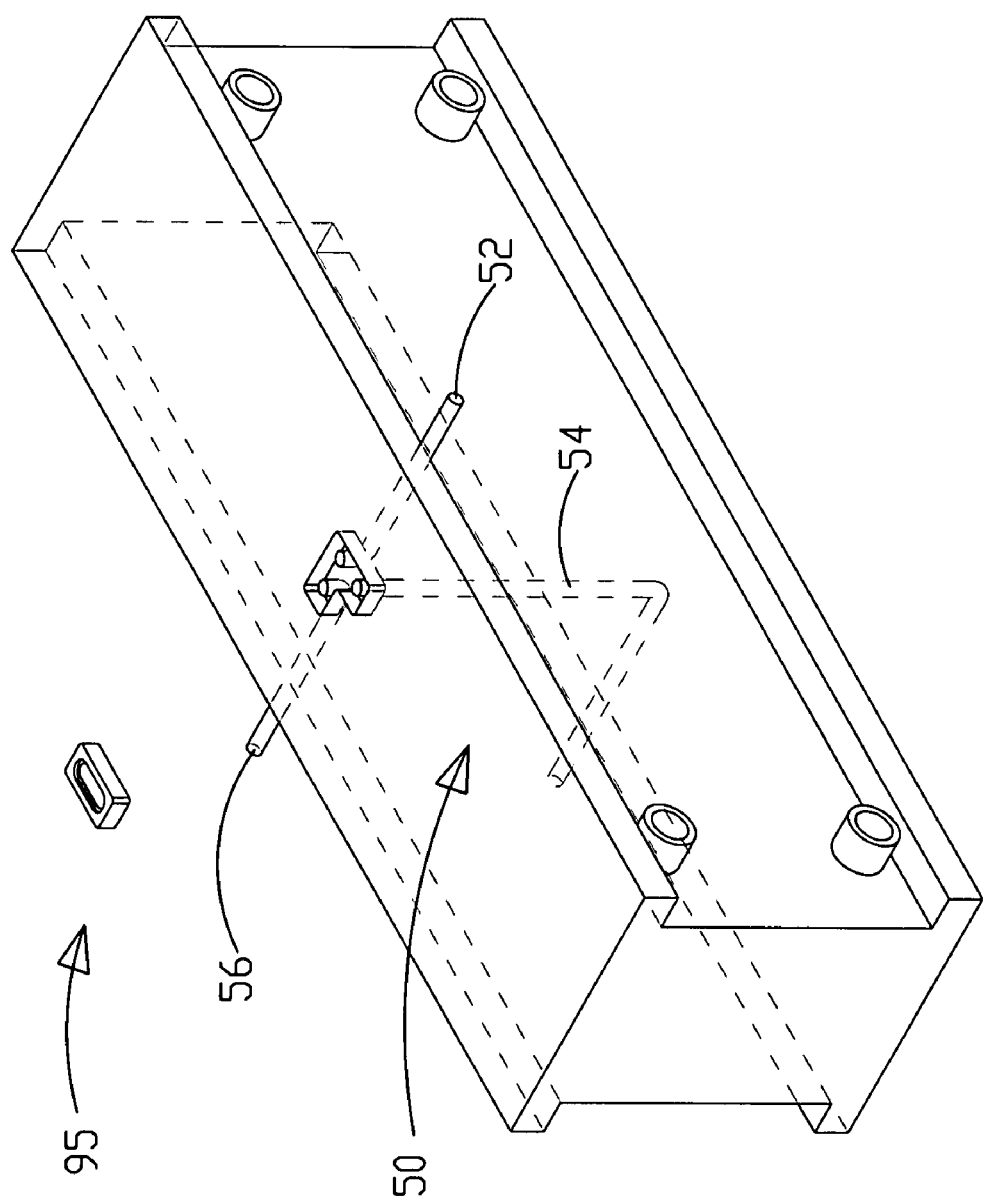
FIG. 9 shows a structural schematic diagram according to another preferred embodiment of the present invention.

FIG. 9 shows a structural schematic diagram according to another preferred embodiment of the present invention. As shown in the figure, the difference between the present preferred embodiment and the previous one is that in the present preferred embodiment, a coupling electrode 56 is further included. A first end of the coupling electrode 56 is adapted on the second side 404, and connects with the negative terminal of the second fuel cell 70. The switch 95 connects electrically with the second end of the negative electrode 52, the second end of the positive electrode 54, and the second end of the coupling electrode 56. Thereby, the second end of the positive electrode 54 or the second end of the coupling electrode 56 connects electrically to the second end of the negative electrode 52.

In the present preferred embodiment, a jumper is used as the switch 95 for further description. When cascading the first and the second fuel cells 60, 70, it is only necessary to plug the jumper to the second end of the negative electrode 52 and second end of the positive electrode 54. If the jumper is plug to the second end of the positive electrode 54 and the second end of the coupling electrode 56, then the second fuel cell 70 will not supply power, and the coupling electrode 56 will be used to isolate the second fuel cell 70. Thereby, other fuel cells still can be cascaded together. Thus, when the second fuel cell 70 is failed or damaged, the operation of other fuel cells will not be affected.

Figure 10:
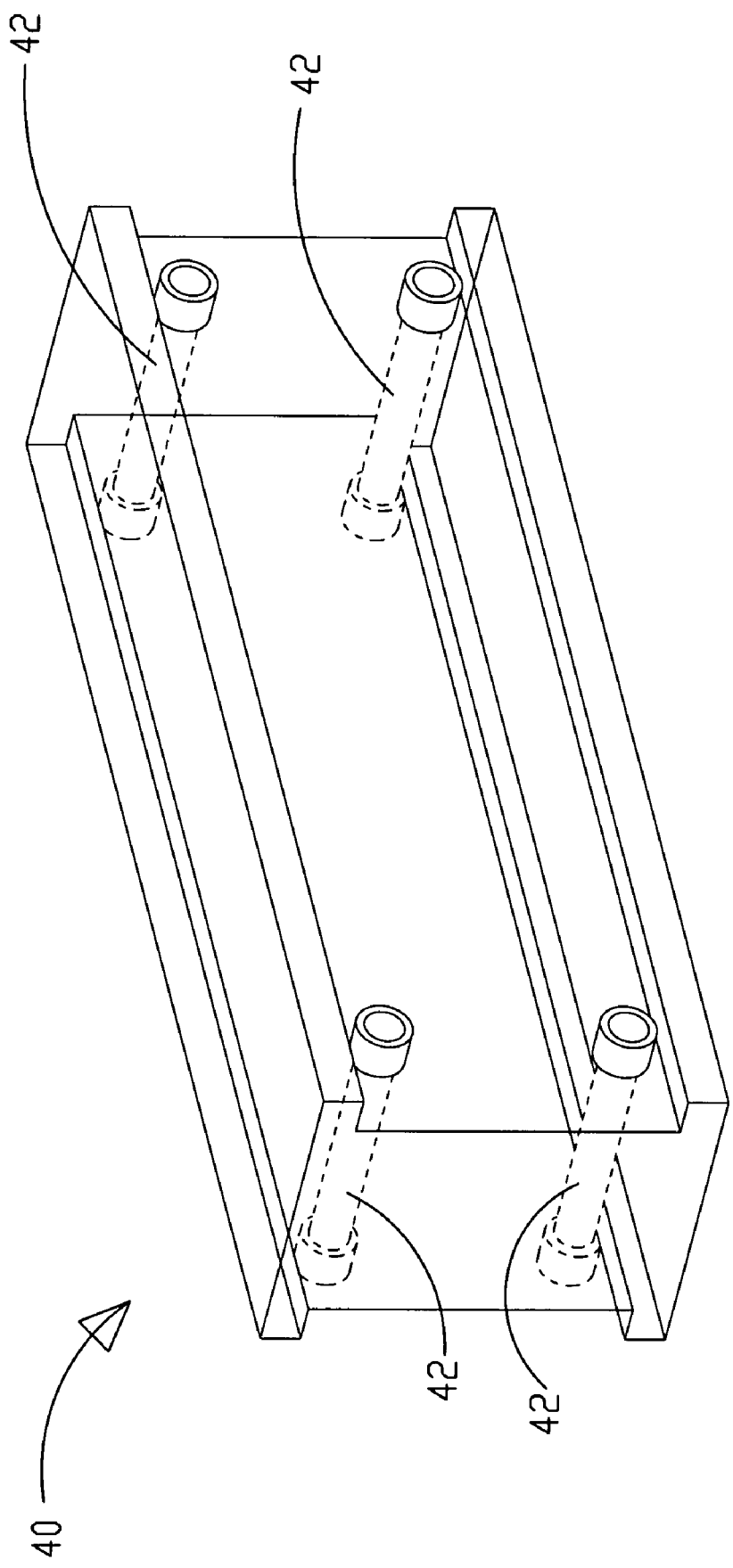
FIG. 10 shows a structural schematic diagram according to another preferred embodiment of the present invention.
Figure 11:
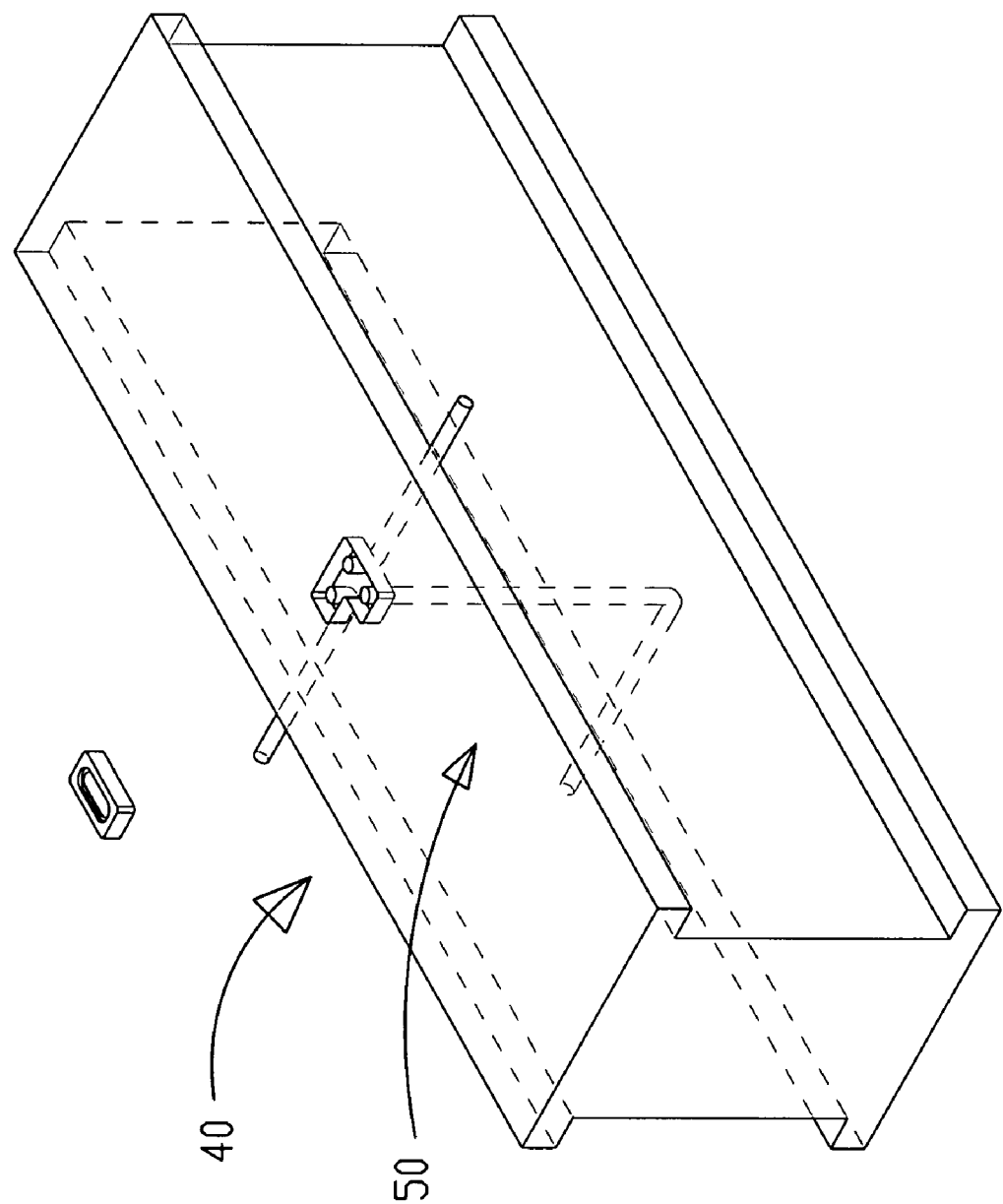
FIG. 11 shows a structural schematic diagram according to another preferred embodiment of the present invention.

FIGS. 10 and 11 show structural schematic diagrams according to other preferred embodiments of the present invention. As shown in FIG. 10, the difference between the present preferred embodiment and the previous one is that in the present preferred embodiment, only the channels 42 are adapted in the body 40. No conductive module 50 is adapted. Thereby, the fuel or oxidant gas of the two fuel cells communicates with each other, and electrical wiring is used for cascading the two fuel cells. Alternatively, the two fuel cells can be connected to different loads. In addition, as shown in FIG. 11, only the conductive module is adapted in the body 40 used for cascading the two fuel cells. The fuel or oxidant gas channels do not communicate with each other. Thereby, the two fuel cells can use different fuels or oxidant gases. Consequently, the two fuel cells can be connected according to different needs of a user, making the applications of the present invention flexible.

To sum up, the present invention provides a coupling structure of fuel cells, which comprises a body, a plurality of channels, and a conductive module. A first fuel cell and a second fuel cell are adapted on both sides of the body. The plurality of channels penetrates through both sides of the body. One or more fuel-guiding inlets, fuel-guiding outlets, oxidant-gas-guiding inlets, and oxidant-gas-guiding outlets are connected to each channel of the first and the second fuel cells, respectively. Both ends of the conductive module penetrate the first and the second sides, and connect to a negative terminal of the first fuel cell and a positive terminal of the second fuel cell, respectively. Thereby, by the coupling module, the positive and negative terminals of the two fuel cells are cascaded to or isolated from each other. When some fuel cells are failed or damaged, those failed or damaged fuel cells can also be isolated without affecting the operation of other fuel cells. Besides, the channels are used to communicate the fuel or the oxidant gas of the plurality of fuel cells, further enhancing convenience of cascading planarly fuel cells.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A coupling structure of fuel cells, comprising:
   a body, having a first side, a second side, and a plurality of channels, the plurality of channel penetrating through the first side and the second side, the first side having a first fuel cell, the second side having a second fuel cell, one or more fuel-guiding inlets, fuel-guiding outlets, oxidant-gas-guiding inlets, and oxidant-gas-guiding outlets adapted on the sides of the first and the second fuel cells facing the body, and each of the channels connecting to the fuel-guiding inlet, the fuel-guiding outlet, the oxidant-gas-guiding inlet, and the oxidant-gas-guiding outlet of the first and the second fuel cells, respectively; and
   a conductive module, adapted on the body, and connecting electrically to a negative terminal of the first fuel cell and a positive terminal of the second fuel cell.

2. The coupling structure of fuel cells of claim 1, wherein the first side has a first trench, and the second side has a second trench, the first trench installing the first fuel cell, and second trench installing the second fuel cell.

3. The coupling structure of fuel cells of claim 1, wherein the conductive module is adapted on both sides of the body and penetrates the first side and the second side.

4. The coupling structure of fuel cells of claim 1, wherein the conductive module comprises:
   a negative electrode, a first end thereof being adapted on the first side and connecting with the negative terminal of the first fuel cell; and
   a positive electrode, a first end thereof being adapted on the second side and connecting with the positive terminal of the second fuel cell, a second end thereof connecting electrically with a second end of the negative electrode.

5. The coupling structure of fuel cells of claim 3, wherein the conductive module further comprises a switch, an accommodating trench is adapted on top of the body for accommodating the switch, and connecting electrically with the second end of the negative electrode and the second end of the positive electrode, switch is a jumper or a Complementary Metal-Oxide-Semiconductor (CMOS) switch.

6. The coupling structure of fuel cells of claim 1, wherein the conductive module comprises:
   a negative electrode, a first end thereof being adapted on the first side and connecting with the negative terminal of the first fuel cell; and
   a positive electrode, a first end thereof being adapted on the second side and connecting with the positive terminal of the second fuel cell; and a coupling electrode, a first end thereof being adapted on the second side and connecting electrically with the negative terminal of the second fuel cell;
   wherein a second end of the positive electrode connects electrically with a second end of the negative electrode.

7. The coupling structure of fuel cells of claim 6, wherein the conductive module further comprises a switch, an accommodating trench is adapted on top of the body for accommodating the switch, and connecting electrically with the second end of the negative electrode and the second end of the positive electrode, the switch is a jumper or a Complementary Metal-Oxide-Semiconductor (CMOS) switch.

8. The coupling structure of fuel cells of claim 1, wherein the first fuel cell comprises:
   a membrane electrode assembly;
   a flow field plate of fuel, adapted on one side of the membrane electrode assembly, a fuel channel, the fuel-guiding inlet, and the fuel-guiding outlet being adapted on one side of the flow field plate of fuel, and the fuel channel, the fuel-guiding inlet, and the fuel-guiding outlet communicating with each other, the fuel-guiding inlet and the fuel-guiding outlet comprise a first fuel-guiding inlet, a first fuel-guiding outlet adjacent to the first fuel-guiding inlet, a second fuel-guiding inlet opposite to the first fuel-guiding inlet, and a second fuel-guiding outlet adjacent to the second fuel-guiding inlet and opposite to the first fuel-guiding outlet;
   a flow field plate of oxidant gas, adapted on the other side of the membrane electrode assembly, an oxidant gas channel, the oxidant-gas-guiding inlet, and the oxidant-gas-guiding outlet being adapted on one side of the flow field plate of oxidant gas, and the oxidant gas channel, the oxidant-gas-guiding inlet, and the oxidant-gas-guiding outlet communicating with each other, the oxidant-gas-guiding inlet and the oxidant-gas-guiding outlet comprise a first oxidant-gas-guiding inlet, a first oxidant-gas-guiding outlet adjacent to the first oxidant-gas-guiding inlet, a second oxidant-gas-guiding inlet opposite to the first oxidant-gas-guiding inlet, and a second oxidant-gas-guiding outlet adjacent to the second oxidant-gas-guiding inlet and opposite to the first oxidant-gas-guiding outlet;
   a plurality of first block member, covering the second fuel-guiding inlet and the second oxidant-gas-guiding inlet, respectively; and
   a plurality of second block member, covering the second fuel-guiding outlet and the second oxidant-gas-guiding outlet, respectively.

9. The coupling structure of fuel cells of claim 1, wherein the second fuel cell comprises:
   a membrane electrode assembly;
   a flow field plate of fuel, adapted on one side of the membrane electrode assembly, a fuel channel, the fuel-guiding inlet, and the fuel-guiding outlet being adapted on one side of the flow field plate of fuel, and the fuel channel, the fuel-guiding inlet, and the fuel-guiding outlet communicating with each other, the fuel-guiding inlet and the fuel-guiding outlet comprise a first fuel-guiding inlet, a first fuel-guiding outlet adjacent to the first fuel-guiding inlet, a second fuel-guiding inlet opposite to the first fuel-guiding inlet, and a second fuel-guiding outlet adjacent to the second fuel-guiding inlet and opposite to the first fuel-guiding outlet;
   a flow field plate of oxidant gas, adapted on the other side of the membrane electrode assembly, an oxidant gas channel, the oxidant-gas-guiding inlet, and the oxidant-gas-guiding outlet being adapted on one side of the flow field plate of oxidant gas, and the oxidant gas channel, the oxidant-gas-guiding inlet, and the oxidant-gas-guiding outlet communicating with each other, the oxidant-gas-guiding inlet and the oxidant-gas-guiding outlet comprise a first oxidant-gas-guiding inlet, a first oxidant-gas-guiding outlet adjacent to the first oxidant-gas-guiding inlet, a second oxidant-gas-guiding inlet opposite to the first oxidant-gas-guiding inlet, and a second oxidant-gas-guiding outlet adjacent to the second oxidant-gas-guiding inlet and opposite to the first oxidant-gas-guiding outlet;
   a plurality of first block member, covering the second fuel-guiding inlet and the second oxidant-gas-guiding inlet, respectively; and a plurality of second block member, covering the second fuel-guiding outlet and the second oxidant-gas-guiding outlet, respectively.

10. The coupling structure of fuel cells of claim 1, wherein a coupling device is adapted on both ends of the channels, respectively.

11. A coupling structure of fuel cells, comprising:
a body, having a first side, a second side, and a plurality of channels, the plurality of channel penetrating through the first side and the second side, the first side having a first fuel cell, the second side having a second fuel cell, a negative terminal of the first fuel cell connecting electrically with a positive terminal of the second fuel cell, one or more fuel-guiding inlets, fuel-guiding outlets, oxidant-gas-guiding inlets, and oxidant-gas-guiding outlets adapted on the sides of the first and the second fuel cells facing the body, and each of the channels connecting to the fuel-guiding inlet, the fuel-guiding outlet, the oxidant-gas-guiding inlet, and the oxidant-gas-guiding outlet of the first and the second fuel cells, respectively;
wherein a coupling device is adapted on both ends of the channels, respectively.

12. The coupling structure of fuel cells of claim 11, wherein the first side has a first trench, and the second side has a second trench, the first trench installing the first fuel cell, and second trench installing the second fuel cell.

13. The coupling structure of fuel cells of claim 11, wherein the first fuel cell comprises:
a membrane electrode assembly;
a flow field plate of fuel, adapted on one side of the membrane electrode assembly, a fuel channel, the fuel-guiding inlet, and the fuel-guiding outlet being adapted on one side of the flow field plate of fuel, and the fuel channel, the fuel-guiding inlet, and the fuel-guiding outlet communicating with each other, the fuel-guiding inlet and the fuel-guiding outlet comprise a first fuel-guiding inlet, a first fuel-guiding outlet adjacent to the first fuel-guiding inlet, a second fuel-guiding inlet opposite to the first fuel-guiding inlet, and a second fuel-guiding outlet adjacent to the second fuel-guiding inlet and opposite to the first fuel-guiding outlet;
a flow field plate of oxidant gas, adapted on the other side of the membrane electrode assembly, an oxidant gas channel, the oxidant-gas-guiding inlet, and the oxidant-gas-guiding outlet being adapted on one side of the flow field plate of oxidant gas, and the oxidant gas channel, the oxidant-gas-guiding inlet, and the oxidant-gas-guiding outlet communicating with each other, the oxidant-gas-guiding inlet and the oxidant-gas-guiding outlet comprise a first oxidant-gas-guiding inlet, a first oxidant-gas-guiding outlet adjacent to the first oxidant-gas-guiding inlet, a second oxidant-gas-guiding inlet opposite to the first oxidant-gas-guiding inlet, and a second oxidant-gas-guiding outlet adjacent to the second oxidant-gas-guiding inlet and opposite to the first oxidant-gas-guiding outlet;
a plurality of first block member, covering the second fuel-guiding inlet and the second oxidant-gas-guiding inlet, respectively; and
a plurality of second block member, covering the second fuel-guiding outlet and the second oxidant-gas-guiding outlet, respectively.

14. The coupling structure of fuel cells of claim 11, wherein the second fuel cell comprises:
a membrane electrode assembly;
a flow field plate of fuel, adapted on one side of the membrane electrode assembly, a fuel channel, the fuel-guiding inlet, and the fuel-guiding outlet being adapted on one side of the flow field plate of fuel, and the fuel channel, the fuel-guiding inlet, and the fuel-guiding outlet communicating with each other, the fuel-guiding inlet and the fuel-guiding outlet comprise a first fuel-guiding inlet, a first fuel-guiding outlet adjacent to the first fuel-guiding inlet, a second fuel-guiding inlet opposite to the first fuel-guiding inlet, and a second fuel-guiding outlet adjacent to the second fuel-guiding inlet and opposite to the first fuel-guiding outlet;
a flow field plate of oxidant gas, adapted on the other side of the membrane electrode assembly, an oxidant gas channel, the oxidant-gas-guiding inlet, and the oxidant-gas-guiding outlet being adapted on one side of the flow field plate of oxidant gas, and the oxidant gas channel, the oxidant-gas-guiding inlet, and the oxidant-gas-guiding outlet communicating with each other, the oxidant-gas-guiding inlet and the oxidant-gas-guiding outlet comprise a first oxidant-gas-guiding inlet, a first oxidant-gas-guiding outlet adjacent to the first oxidant-gas-guiding inlet, a second oxidant-gas-guiding inlet opposite to the first oxidant-gas-guiding inlet, and a second oxidant-gas-guiding outlet adjacent to the second oxidant-gas-guiding inlet and opposite to the first oxidant-gas-guiding outlet;
a plurality of first block member, covering the second fuel-guiding inlet and the second oxidant-gas-guiding inlet, respectively; and
a plurality of second block member, covering the second fuel-guiding outlet and the second oxidant-gas-guiding outlet, respectively.

15. A coupling structure of fuel cells, comprising:
a body, having a first side and a second side, the first side having a first fuel cell, and the second side having a second fuel cell;
one or more fuel-guiding inlets, fuel-guiding outlets, oxidant-gas-guiding inlets, and oxidant-gas-guiding outlets, being adapted on the sides of the first and the second fuel cells facing the body; and
a conductive module, adapted on both sides of the body and penetrates the first side and the second side, and connecting electrically to a negative terminal of the first fuel cell and a positive terminal of the second fuel cell.

16. The coupling structure of fuel cells of claim 15, wherein the first side has a first trench, and the second side has a second trench, the first trench installing the first fuel cell, and second trench installing the second fuel cell.

17. The coupling structure of fuel cells of claim 15, wherein the conductive module comprises: a negative electrode, a first end thereof being adapted on the first side and connecting with the negative terminal of the first fuel cell; and a positive electrode, a first end thereof being adapted on the second side and connecting with the positive terminal of the second fuel cell, a second end thereof connecting electrically with a second end of the negative electrode.

18. The coupling structure of fuel cells of claim 17, wherein the conductive module further comprises a switch, an accommodating trench is adapted on top of the body for accommodating the switch, and connecting electrically with the second end of the negative electrode and the second end of the positive electrode, the switch is a jumper or a Complementary Metal-Oxide-Semiconductor (CMOS) switch.

19. The coupling structure of fuel cells of claim 15, wherein the conductive module comprises:

a negative electrode, a first end thereof being adapted on the first side and connecting with the negative terminal of the first fuel cell; and a positive electrode, a first end thereof being adapted on the second side and connecting with the positive terminal of the second fuel cell; and a coupling electrode, a first end thereof being adapted on the second side and connecting electrically with the negative terminal of the second fuel cell;

wherein a second end of the positive electrode connects electrically with a second end of the negative electrode.

20. The coupling structure of fuel cells of claim 19, wherein the conductive module further comprises a switch, an accommodating trench is adapted on top of the body for accommodating the switch, and connecting electrically with the second end of the negative electrode and the second end of the positive electrode, the switch is a Complementary Metal-Oxide-Semiconductor (CMOS) switch.

21. The coupling structure of fuel cells of claim 15, wherein the first fuel cell comprises:

a membrane electrode assembly;

a flow field plate of fuel, adapted on one side of the membrane electrode assembly, a fuel channel, the fuel-guiding inlet, and the fuel-guiding outlet being adapted on one side of the flow field plate of fuel, and the fuel channel, the fuel-guiding inlet, and the fuel-guiding outlet communicating with each other, the fuel-guiding inlet and the fuel-guiding outlet comprise a first fuel-guiding inlet, a first fuel-guiding outlet adjacent to the first fuel-guiding inlet, a second fuel-guiding inlet opposite to the first fuel-guiding inlet, and a second fuel-guiding outlet adjacent to the second fuel-guiding inlet and opposite to the first fuel-guiding outlet;

a flow field plate of oxidant gas, adapted on the other side of the membrane electrode assembly, an oxidant gas channel, the oxidant-gas-guiding inlet, and the oxidant-gas-guiding outlet being adapted on one side of the flow field plate of oxidant gas, and the oxidant gas channel, the oxidant-gas-guiding inlet, and the oxidant-gas-guiding outlet communicating with each other, the oxidant-gas-guiding inlet and the oxidant-gas-guiding outlet comprise a first oxidant-gas-guiding inlet, a first oxidant-gas-guiding outlet adjacent to the first oxidant-gas-guiding inlet, a second oxidant-gas-guiding inlet opposite to the first oxidant-gas-guiding inlet, and a second oxidant-gas-guiding outlet adjacent to the second oxidant-gas-guiding inlet and opposite to the first oxidant-gas-guiding outlet;

a plurality of first block member, covering the second fuel-guiding inlet and the second oxidant-gas-guiding inlet, respectively; and a plurality of second block member, covering the second fuel-guiding outlet and the second oxidant-gas-guiding outlet, respectively.

22. The coupling structure of fuel cells of claim 15, wherein the second fuel cell comprises:

a membrane electrode assembly;

a flow field plate of fuel, adapted on one side of the membrane electrode assembly, a fuel channel, the fuel-guiding inlet, and the fuel-guiding outlet being adapted on one side of the flow field plate of fuel, and the fuel channel, the fuel-guiding inlet, and the fuel-guiding outlet communicating with each other, the fuel-guiding inlet and the fuel-guiding outlet comprise a first fuel-guiding inlet, a first fuel-guiding outlet adjacent to the first fuel-guiding inlet, a second fuel-guiding inlet opposite to the first fuel-guiding inlet, and a second fuel-guiding outlet adjacent to the second fuel-guiding inlet and opposite to the first fuel-guiding outlet;

a flow field plate of oxidant gas, adapted on the other side of the membrane electrode assembly, an oxidant gas channel, the oxidant-gas-guiding inlet, and the oxidant-gas-guiding outlet being adapted on one side of the flow field plate of oxidant gas, and the oxidant gas channel, the oxidant-gas-guiding inlet, and the oxidant-gas-guiding outlet communicating with each other, the oxidant-gas-guiding inlet and the oxidant-gas-guiding outlet comprise a first oxidant-gas-guiding inlet, a first oxidant-gas-guiding outlet adjacent to the first oxidant-gas-guiding inlet, a second oxidant-gas-guiding inlet opposite to the first oxidant-gas-guiding inlet, and a second oxidant-gas-guiding outlet adjacent to the second oxidant-gas-guiding inlet and opposite to the first oxidant-gas-guiding outlet;

a plurality of first block member, covering the second fuel-guiding inlet and the second oxidant-gas-guiding inlet, respectively; and a plurality of second block member, covering the second fuel-guiding outlet and the second oxidant-gas-guiding outlet, respectively.

23. The coupling structure of fuel cells of claim 21, wherein a coupling device is adapted on both ends of the channels, respectively.

* * * * *